(12) United States Patent
Guo et al.

(10) Patent No.: US 11,614,863 B2
(45) Date of Patent: Mar. 28, 2023

(54) METHOD AND DEVICE FOR DISPLAYING KEYBOARD TOOLBAR AND STORAGE MEDIUM

(71) Applicant: BEIJING XIAOMI MOBILE SOFTWARE CO., LTD., Beijing (CN)

(72) Inventors: Runhua Guo, Beijing (CN); Lin Fan, Beijing (CN); Zhanwei Luo, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 17/487,978

(22) Filed: Sep. 28, 2021

(65) Prior Publication Data
US 2022/0308751 A1    Sep. 29, 2022

(30) Foreign Application Priority Data
Mar. 26, 2021    (CN) .......................... 202110328326.7

(51) Int. Cl.
*G06F 3/048*       (2013.01)
*G06F 3/04886*    (2022.01)

(52) U.S. Cl.
CPC ................................ *G06F 3/04886* (2013.01)

(58) Field of Classification Search
CPC .................................................. G06F 3/04886
See application file for complete search history.

(56) References Cited

U.S. PATENT DOCUMENTS

| | | | |
|---|---|---|---|
| 2012/0113011 A1 | 5/2012 | Wu et al. | |
| 2012/0146911 A1 | 6/2012 | Griffin | |
| 2016/0147440 A1 | 5/2016 | Leyon | |
| 2017/0097689 A1* | 4/2017 | Miller | .................. G06F 1/1624 |
| 2018/0136794 A1 | 5/2018 | Cassidy et al. | |
| 2019/0220183 A1* | 7/2019 | Mummidi | ............... G06F 9/451 |
| 2020/0360806 A1* | 11/2020 | Sun | ......................... A63F 13/52 |
| 2021/0216203 A1* | 7/2021 | Wu | ......................... G06F 3/023 |

OTHER PUBLICATIONS

Extended European Search Report of EP Application No. 21208490.9 dated May 2, 2022, (12p).

* cited by examiner

*Primary Examiner* — David E Choi
(74) *Attorney, Agent, or Firm* — Arch & Lake LLP

(57) ABSTRACT

The present disclosure relates to a method for displaying a keyboard toolbar, a device for displaying a keyboard toolbar and a storage medium. The method for displaying the keyboard toolbar is applied to a terminal having a display screen and being connected with an external physical keyboard, and includes: determining, in response to detecting a calling instruction from the external physical keyboard for triggering display of the keyboard toolbar on the display screen of the terminal, the keyboard toolbar displayed on the display screen, the keyboard toolbar including a plurality of partitions and different partitions being configured to display different toolbars; and displaying the keyboard toolbar with the plurality of partitions in a resident manner on the display screen of the terminal.

12 Claims, 9 Drawing Sheets

METHOD AND DEVICE FOR DISPLAYING KEYBOARD TOOLBAR AND STORAGE MEDIUM

CROSS-REFERENCE TO RELATED APPLICATIONS

This application is based upon and claims priority to Chinese Patent Application No. 202110328326.7, filed on Mar. 26, 2021, the entire content of which is incorporated herein by reference for all purposes.

TECHNICAL FIELD

The present disclosure relates to the field of terminal technology, and in particular to a method for displaying a keyboard toolbar, a device for displaying a keyboard toolbar and a storage medium.

BACKGROUND

With the development of science and technology, terminal technology has been greatly developed, and terminal products have varied forms, rich functions, and higher configurations, which meet people's various needs in work and life. Terminals controlled by touch screens have higher and higher performance configurations. In order to make the terminals have more advanced performance, terminals without physical keyboards may be externally connected with the physical keyboards to overcome the shortcomings when a text input is only made through the touch screen.

Sometimes, the terminals such as tablet computers usually display a floating keyboard toolbar when using an external physical keyboard for text input. The display position of the floating keyboard toolbar is fixed, which will block the content currently displayed on the screen and affect the operation of the user. Further, the display content is fixed, which cannot meet the personalized needs of the user. When the keyboard toolbar is fixedly displayed, the fixed display area of the keyboard toolbar will also conflict with the display position of the keyboard toolbar of a currently used application, which may affect the use of the user.

SUMMARY

The present disclosure provides a method for displaying a keyboard toolbar, a device for displaying a keyboard toolbar and a storage medium.

An aspect of examples of the present disclosure provides a method for displaying a keyboard toolbar, which is applied to a terminal having a display screen and being connected with an external physical keyboard, including: determining, in response to detecting a calling instruction from the external physical keyboard for triggering display of the keyboard toolbar on the display screen of the terminal, the keyboard toolbar displayed on the display screen, the keyboard toolbar including a plurality of partitions and different partitions being configured to display different toolbars; and displaying the keyboard toolbar with the plurality of partitions in a resident manner on the display screen of the terminal.

In an example, determining the keyboard toolbar displayed on the display screen includes: determining a resident shortcut tool residentially displayed in the keyboard toolbar; and determining the keyboard toolbar including a first partition, the first partition being configured to residentially display the resident shortcut tool.

In an example, determining the keyboard toolbar displayed on the display screen includes: determining an associated word corresponding to an input text in response to that the calling instruction is an input method calling instruction and the input text is displayed in a text input box of the display screen; and determining the keyboard toolbar including a second partition, the second partition being configured to display the associated word corresponding to the input text.

In an example, the method further includes: updating the associated word displayed in the second partition in response to receiving a gesture operation for updating the associated word in the second partition.

In an example, determining the keyboard toolbar displayed on the display screen includes: obtaining a shortcut tool selected by a user from another shortcut tool different from the resident shortcut tool in response to that an application currently run on the terminal calls said other shortcut tool; and determining the keyboard toolbar including a third partition, the third partition being configured to display the shortcut tool selected by the user from said other shortcut tool.

In an example, displaying the keyboard toolbar with the plurality of partitions in the resident manner on the display screen of the terminal may include: displaying the keyboard toolbar with the plurality of partitions in the resident manner at a bottom of the display screen of the terminal.

Another aspect of examples of the present disclosure provides a device for displaying a keyboard toolbar, which is applied to a terminal having a display screen and being connected with an external physical keyboard, including: a detecting module, configured to detect a calling instruction from the external physical keyboard for triggering display of the keyboard toolbar on the display screen of the terminal; a determining module, configured to determine the keyboard toolbar displayed on the display screen, the keyboard toolbar including a plurality of partitions and different partitions being configured to display different toolbars; and a displaying module, configured to display the keyboard toolbar with the plurality of partitions in a resident manner on the display screen of the terminal.

In an example, the determining module determines the keyboard toolbar displayed on the display screen by: determining a resident shortcut tool residentially displayed in the keyboard toolbar; and determining the keyboard toolbar including a first partition, the first partition being configured to residentially display the resident shortcut tool.

In an example, the determining module determines the keyboard toolbar displayed on the display screen by: determining an associated word corresponding to an input text in response to that the calling instruction is an input method calling instruction and the input text is displayed in a text input box of the display screen; and determining the keyboard toolbar including a second partition, the second partition being configured to display the associated word corresponding to the input text.

In an example, the displaying module is further configured to: update the associated word displayed in the second partition in response to receiving a gesture operation for updating the associated word in the second partition.

In an example, the determining module determines the keyboard toolbar displayed on the display screen by: obtaining a shortcut tool selected by a user from an other shortcut tool different from the resident shortcut tool in response to that an application currently run on the terminal calls said other shortcut tool; and determining the keyboard toolbar including a third partition, the third partition being configured to display the shortcut tool selected by the user from said other shortcut tool.

In an example, the displaying module displays the keyboard toolbar with the plurality of partitions in the resident manner on the display screen of the terminal by: displaying the keyboard toolbar with the plurality of partitions in the resident manner at a bottom of the display screen of the terminal.

Yet another aspect of examples of the present disclosure provides a device for displaying a keyboard toolbar, including: a processor; and a memory storing instructions that can be executed by the processor; the processor is configured to execute any one of the above method for displaying the keyboard toolbar.

Further another aspect of examples of the present disclosure provides a non-transitory computer-readable storage medium storing instructions that, when being executed by a processor of a mobile terminal, cause the mobile terminal to execute any one of the above method for displaying the keyboard toolbar.

It should be understood that the above general description and the following detailed description are only exemplary and explanatory, which do not intend to limit the present disclosure.

BRIEF DESCRIPTION OF THE DRAWINGS

The drawings here are incorporated into the specification and constitute a part of the specification, show examples that conform to the present disclosure, and are used together with the specification to explain the principle of the present disclosure.

DETAILED DESCRIPTION

Examples will be described in detail here, and examples thereof are shown in the accompanying drawings. The implementations described in the following examples do not represent all implementations in the present disclosure. Rather, they are merely examples of devices and methods in some aspects of the present disclosure.

As terminal products have varied forms, rich functions, and higher configurations, people's various needs in work and life are met. Terminals having touch screens have higher and higher performance configurations. In order to make the terminals have more advanced performance, terminals without physical keyboards may be externally connected with the physical keyboards for inputting to be used equivalently as a notebook computer and thus overcome the shortcomings when an text input is only made through the touch screen.

Sometimes, the terminals such as tablet computers usually display a floating keyboard toolbar when using an external physical keyboard for text input. The display position of the floating keyboard toolbar is fixed, which will block the content currently displayed on the screen and affect the operation of the user. Further, the display content is fixed, which cannot meet the personalized needs of the user. When the keyboard toolbar is fixedly displayed, the fixed display area of the keyboard toolbar will also conflict with the display position of the keyboard toolbar of a currently used application, which will affect the use of the user.

Accordingly, the present disclosure provides a method for displaying a keyboard toolbar, which partitions the keyboard toolbar, and uses different partitions to display different toolbars.

Figure 1:
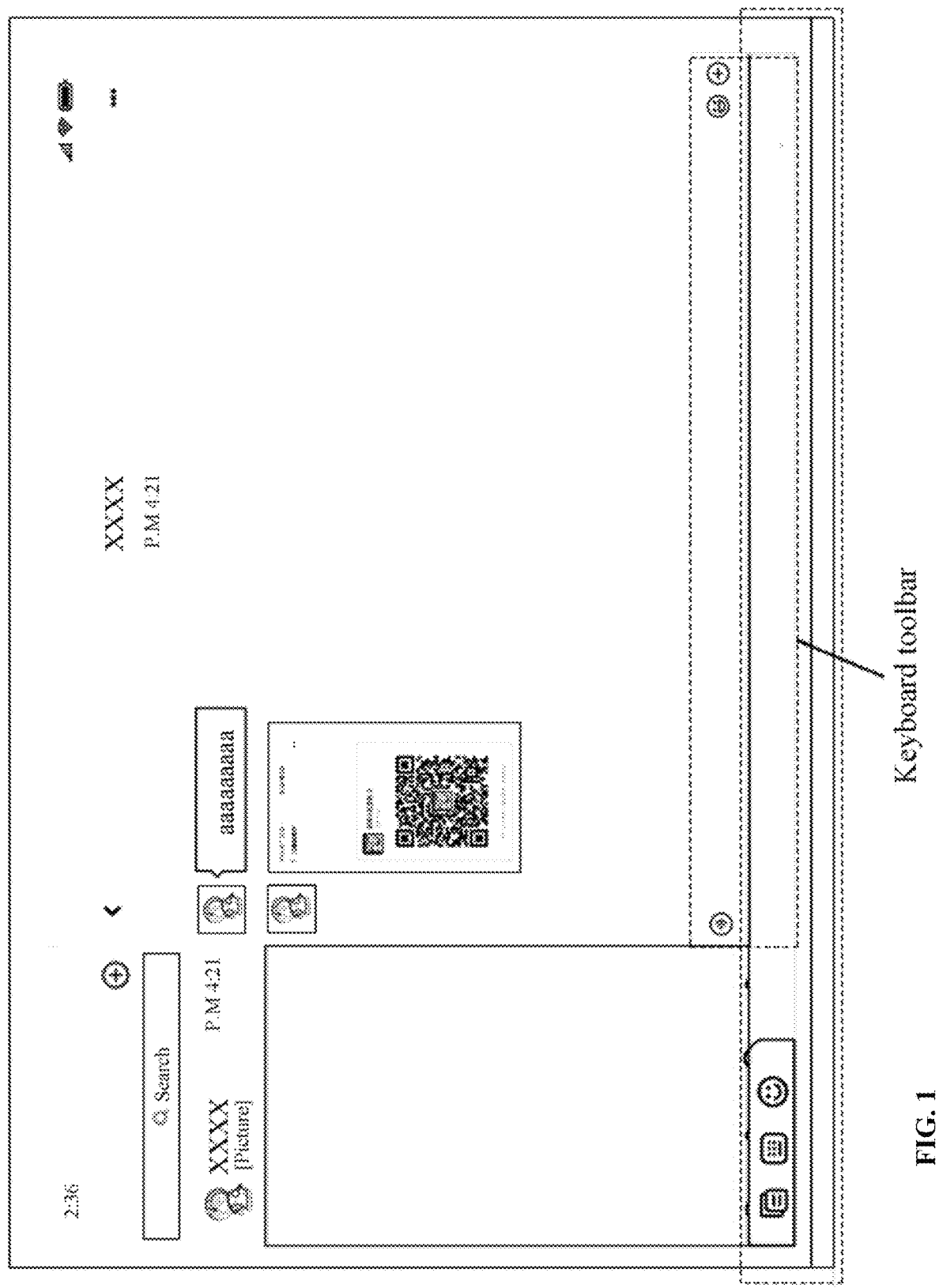
FIG. 1 is an application schematic diagram of a method for displaying a keyboard toolbar according to an example of the present disclosure.
Figure 2:
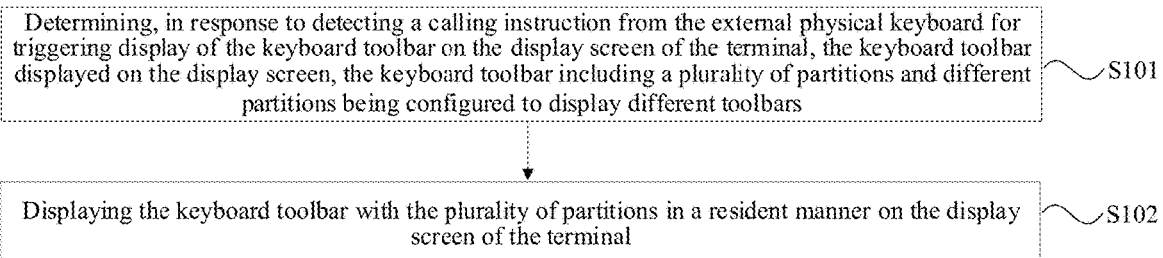
FIG. 2 is a flowchart showing a method for displaying a keyboard toolbar according to an example of the present disclosure.

FIG. 1 is an application schematic diagram of a method for displaying a keyboard toolbar according to an example of the present disclosure, and FIG. 2 is a flowchart showing a method for displaying a keyboard toolbar according to an example of the present disclosure. The method for displaying the keyboard toolbar is applied to a terminal, and the terminal has a display screen and is connected with an external physical keyboard. As shown in FIG. 2, the method for displaying the keyboard toolbar includes:

step S101, determining, in response to detecting a calling instruction from the external physical keyboard for triggering display of the keyboard toolbar on the display screen of the terminal, the keyboard toolbar displayed on the display screen, the keyboard toolbar including a plurality of partitions and different partitions being configured to display different toolbars; and step S102, displaying the keyboard toolbar with the plurality of partitions in a resident manner on the display screen of the terminal.

In the example of the present disclosure, the terminal is connected with the external physical keyboard, and when the external physical keyboard is used for operations such as text input, drawing and the like, the calling instruction may be an input instruction such as clicking a button, a shortcut key of the external physical keyboard and the like, for example, an instruction for calling an input method during a text input to trigger display of the keyboard toolbar on the display screen of the terminal. The keyboard toolbar is displayed on the display screen of the terminal, and is used to comprehensively display tools related to keyboard operation functions, so that a user uses related tools presented in the keyboard toolbar. The keyboard toolbar includes a plurality of different partitions, the different partitions display different toolbars, and the different toolbars may be used for different usage functions, usage scenarios, and the like. The terminal detects the calling instruction from the external physical keyboard for triggering display of the keyboard toolbar, determines the keyboard toolbar, and displays the keyboard toolbar with the plurality of partitions in the resident manner on the display screen of the terminal. That is, the keyboard toolbar maintains resident on the display screen while the terminal is used for input.

Referring to FIG. 1, a display screen of a terminal displays a page for using an instant messaging application. The dotted line shows a keyboard toolbar. The keyboard toolbar includes a plurality of partitions, different partitions are used to display different toolbars, and the keyboard toolbar with the plurality of partitions is displayed in a resident manner on the display screen of the terminal.

According to an example of the present disclosure, the terminal having the display screen is connected with the external physical keyboard for inputting, the calling instruction is input by the external physical keyboard, the keyboard toolbar having the plurality of partitions is displayed on the display screen of the terminal in the resident manner, and different partitions in the keyboard toolbar are configured to display different toolbars, which can realize the resident and partitioned display of the keyboard toolbar. Further, the display area of the display screen of the terminal is not blocked, which improves input operating experience of the user through the external keyboard, and thus improves the operating experience of the user.

Figure 3:
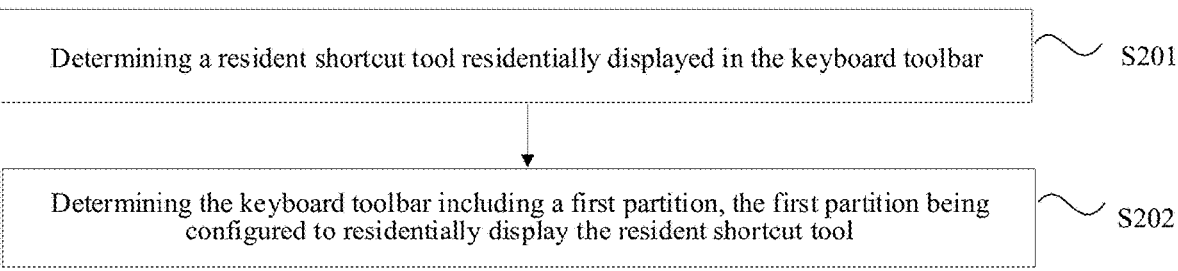
FIG. 3 is a flowchart showing a method for determining a keyboard toolbar according to an example of the present disclosure.

FIG. 3 is a flowchart showing a method for determining a keyboard toolbar according to an example of the present disclosure. As shown in FIG. 3, the method for determining the keyboard toolbar includes:

step S201, determining a resident shortcut tool residentially displayed in the keyboard toolbar; and step S201, determining the keyboard toolbar including a first partition, the first partition being configured to residentially display the resident shortcut tool.

In the example of the present disclosure, the terminal is connected with the external physical keyboard, and the external physical keyboard is used for input. The calling instruction is input through the external physical keyboard, and the keyboard toolbar with a plurality of partitions is displayed in the resident manner on the display screen of the terminal. Different partitions in the keyboard toolbar are used to display different toolbars, and the keyboard toolbar with a plurality of partitions is displayed in the resident manner on the display screen of the terminal. The keyboard toolbar includes a plurality of different partitions, and the plurality partitions include the first partition displaying the resident shortcut tool. When the keyboard toolbar displayed on the display screen is determined, the shortcut tool (i.e., the resident shortcut toll) that is residentially displayed in the keyboard toolbar is determined. The resident shortcut tool may be a shortcut tool that is suitable for most application scenarios in input operations, is frequently used, and is common in various types of input, and can meet usual input requirements, for example, expression tool, setting tool, input mode switching tool, symbol tool, voice input tool and the like. It can be understood that the first partition that displays the resident shortcut tool is resident in the keyboard toolbar, that is, when the keyboard toolbar is determined to be displayed, the first partition is residentially displayed.

Figure 4:
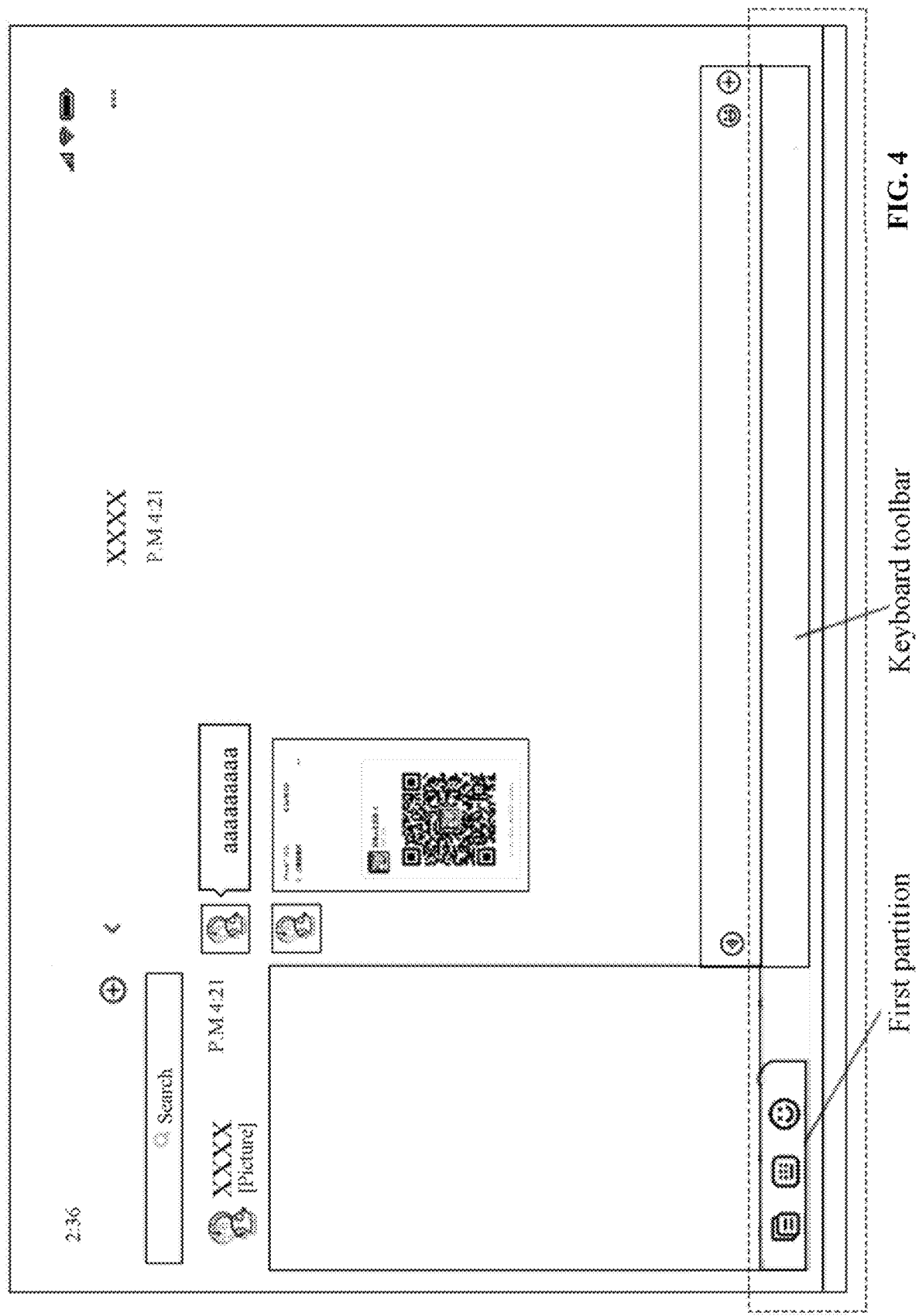
FIG. 4 is an application schematic diagram of a method for displaying a keyboard toolbar according to an example of the present disclosure.

FIG. 4 is an application schematic diagram of a method for displaying a keyboard toolbar according to an example of the present disclosure. Referring to FIG. 4, the display screen of the terminal displays a page for using an instant messaging application. The keyboard toolbar includes a first partition, and the first partition sequentially displays resident shortcut tools such as text editing tool, input mode switching tool, and expression tool. The first partition is residentially displayed in the keyboard toolbar.

According to the example of the present disclosure, the terminal is connected with the external physical keyboard for input, and the keyboard toolbar with a plurality of partitions is displayed in the resident manner on the display screen of the terminal. Different partitions in the keyboard toolbar are used to display different toolbars. The different partitions includes the first partition for displaying the resident shortcut tool, and the first partition is resident in the keyboard toolbar. The partition display of the keyboard toolbar meets daily input operation requirements and improves the input operation experience of the user.

Figure 5:
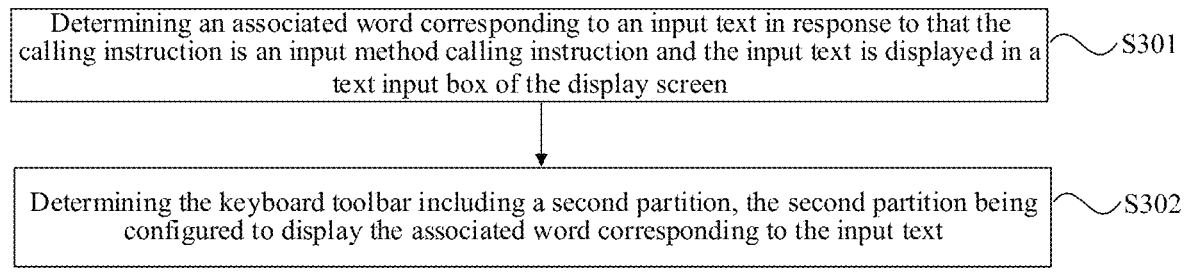
FIG. 5 is a flowchart showing a method for determining a keyboard toolbar according to an example of the present disclosure.

FIG. 5 is a flowchart showing a method for determining a keyboard toolbar according to an example of the present disclosure. As shown in FIG. 5, the method for determining the keyboard toolbar includes:

step S301, determining an associated word corresponding to an input text in response to that the calling instruction is an input method calling instruction and the input text is displayed in a text input box of the display screen; and step S302, determining the keyboard toolbar including a second partition, the second partition being configured to display the associated word corresponding to the input text.

In the example of the present disclosure, the terminal is connected with the external physical keyboard, and the external physical keyboard is used for input. The calling instruction is input through the external physical keyboard, and the keyboard toolbar with a plurality of partitions is displayed in the resident manner on the display screen of the terminal. Different partitions in the keyboard toolbar are used to display different toolbars, and the keyboard toolbar with a plurality of partitions is displayed in the resident manner on the display screen of the terminal. The keyboard toolbar includes a plurality of different partitions. The plurality of partitions include the first partition displaying the resident shortcut tool, and further include the second partition. When the user needs to input text, he/she operates on the external physical keyboard, the input method command is called, the keyboard toolbar including the second partition for being displayed on the display screen is determined. In the second partition, the associated word is displayed during the process of the user inputting text. For example, the user uses the Pinyin input method for text input on the external physical keyboard, and the user clicks the physical keyboard letter key on the keyboard to achieve text input. The text input box on the display screen displays the confirmed text and the letter being input. It can be understood that with the input of pinyin letter, a candidate word is displayed in the form of a floating window in the vicinity of the text input box for the user to select and confirm. The candidate word may be generated based on the pinyin rule. For example, if the user enters the pinyin "k1", based on the pinyin rule and the usage habit of the user, the candidate words such as "考虑，快乐，看来，哭了" will be displayed in the floating window. The inputted text is displayed in the text input box of the display screen, and the associated word corresponding to the inputted text is determined. The associated word may be determined based on the content of the inputted text or the words following the inputted text. The associated word may be adjusted to be displayed through the expression habit of the user. For example, when the input text "why" is displayed in the text input box of the display screen, the associated word corresponding to "why" is determined. The associated word corresponding to "why" may be "I, will, can't, so, want" and so on. The associated word is based on the determined input text to prompt the text to be input, and it is easier to get the content of the text to be input.

Figure 6:
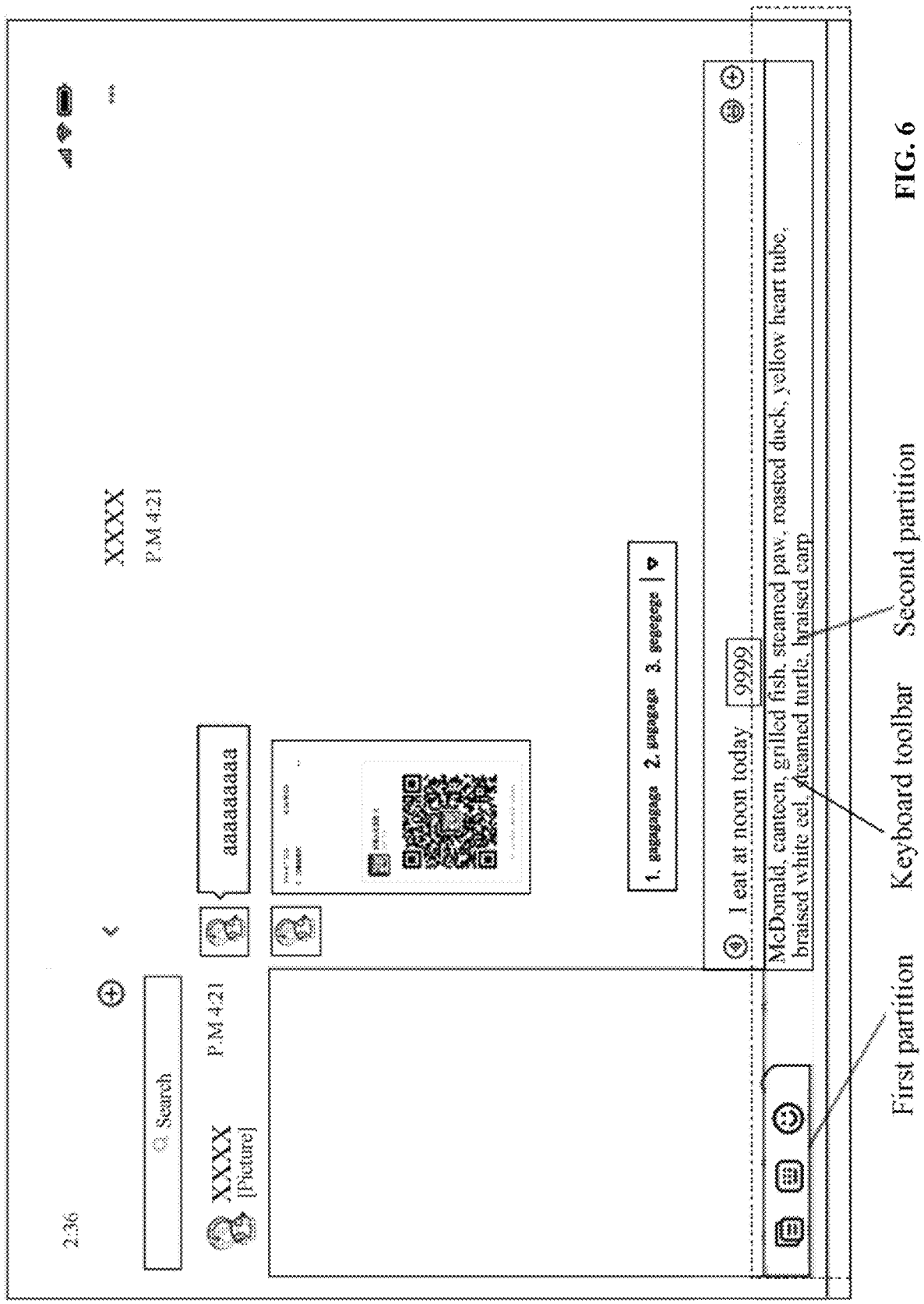
FIG. 6 is an application schematic diagram of a method for displaying a keyboard toolbar according to an example of the present disclosure.

FIG. 6 is an application schematic diagram of a method for displaying a keyboard toolbar according to an example of the present disclosure. Referring to FIG. 6, the display screen of the terminal displays a page for using an instant messaging application. The keyboard toolbar includes the first partition and the second partition. The partition is used to display the resident shortcut tool, and the keyboard toolbar also includes the second partition used to display the associated word corresponding to the input text. The user inputs text in the application. The inputted text is "I eat at noon today", and the associated words displayed in the second partition are "McDonald's, canteen, grilled fish . . . " and the like.

According to the example of the present disclosure, the terminal is connected to the external physical keyboard for input, and the keyboard toolbar is displayed on the display screen of the terminal. Different partitions in the keyboard toolbar are used to display different toolbars. The partitions include the first partition used to display the resident shortcut tool. The first partition is residentially displayed in the keyboard toolbar. When the user calls the input method, the keyboard toolbar also includes the second partition for displaying the associated word corresponding to the input text. During the process of the user inputting text, intelligent association is performed, which facilitates the input operation of the user, improves input efficiency, and improves the input operation experience of the user.

Figure 7:
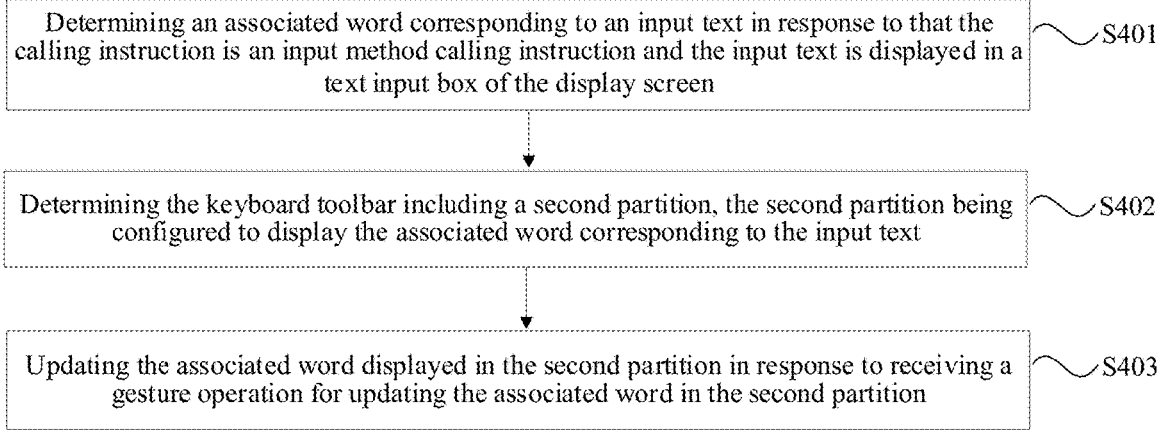
FIG. 7 is a flowchart showing a method for determining a keyboard toolbar according to an example of the present disclosure.

FIG. 7 is a flowchart showing a method for determining a keyboard toolbar according to an example of the present disclosure. As shown in FIG. 7, the method for determining the keyboard toolbar includes:

step S401, determining an associated word corresponding to an input text in response to that the calling instruction is an input method calling instruction and the input text is displayed in a text input box of the display screen;

step 402, determining the keyboard toolbar including a second partition, the second partition being configured to display the associated word corresponding to the input text; and step S403, updating the associated word displayed in the second partition in response to receiving a gesture operation for updating the associated word in the second partition.

In the example of the present disclosure, the external physical keyboard is used for input. The keyboard toolbar with a plurality of partitions is displayed in the resident manner on the display screen of the terminal. The keyboard toolbar includes a plurality of different partitions. The plurality of partitions include the first partition displaying the resident shortcut tool, and further include the second partition. When the user calls the input method command on the external physical keyboard to determine the keyboard toolbar, it is determined that the keyboard toolbar includes the second partition. In the second partition, the associated word is displayed during the process of the user inputting text. For example, when the user inputs text, and the input text "why" is displayed in the text input box of the display screen, the associated word corresponding to "why" is determined. The associated word corresponding to "why" may be "I, will, can't, so, want" and so on. Since the range of the display area is limited, when there are many associated words, multiple associated words cannot be displayed in the corresponding area of the second partition of the keyboard toolbar at the same time. The user updates and displays the associated words in the second partition through the gesture operation. For example, when the associated words in the second partition are displayed horizontally, the user can swipe left and right at the associated words to display other associated words than the currently displayed multiple associated words. For example, when the user inputs text, and the inputted text "I like to eat" is displayed in the text input box on the display screen, the associated word corresponding to "I like to eat" is determined, such as "hot pot, chocolate, McDonald, sweets, meat, vegetables . . . ". There are so many associated words that can follow express "I like to eat", which cannot be displayed in the second partition at once. In the second partition, the top-ranked "hot pot, chocolate, McDonald" are displayed first. If there is no text that the user desires to input in the displayed associated words, the user can update the displayed associated words through a sliding operation, so that "sweets, meat, vegetables" and the like are displayed in the second partition.

According to the example of the present disclosure, the terminal is connected to the external physical keyboard for input, and the keyboard toolbar having a plurality of partitions is displayed on the display screen of the terminal. Different partitions in the keyboard toolbar are used to display different toolbars. The partitions include the first partition used to display the resident shortcut tool. The first partition is residentially displayed in the keyboard toolbar. When the user calls the input method, the keyboard toolbar also includes the second partition for displaying the associated word corresponding to the input text. The associated word displayed in the second partition may be updated based on the operation of the user to display different associated words, which further facilitates the input operation of the user, and improves the input efficiency and the user experience of input operation.

Figure 8:
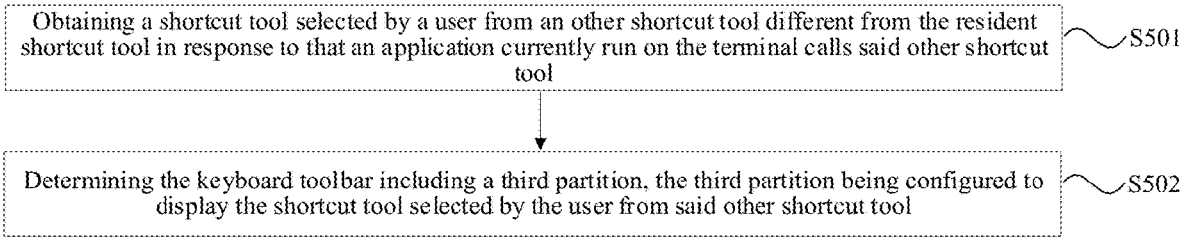
FIG. 8 is a flowchart showing a method for determining a keyboard toolbar according to an example of the present disclosure.

FIG. 8 is a flowchart showing a method for determining a keyboard toolbar according to an example of the present disclosure. As shown in FIG. 8, the method for determining the keyboard toolbar includes:

step S501, obtaining a shortcut tool selected by a user from an other shortcut tool different from the resident shortcut tool in response to that an application currently run on the terminal calls said other shortcut tool; and step S502, determining the keyboard toolbar including a third partition, the third partition being configured to display the shortcut tool selected by the user from said other shortcut tool.

In the example of the present disclosure, the external physical keyboard is used for input. The keyboard toolbar with a plurality of partitions is displayed in the resident manner on the display screen of the terminal. The keyboard toolbar includes a plurality of different partitions. The plurality of partitions include the first partition displaying the resident shortcut tool. When the user calls the input method command on the external physical keyboard to determine the keyboard toolbar, the plurality of the partitions may further display the second partition to display the associated word during the process of the user inputting text. The application currently running on the terminal calls the shortcut tool, and the shortcut tool called by the application is different from the resident shortcut tool in the keyboard toolbar. The shortcut tool selected by the user in the current application is obtained, and in the third partition of the keyboard toolbar, the shortcut tool selected by the user from other shortcut tools is displayed.

For example, the application currently used by the terminal is a drawing application. The drawing application calls shortcut tools such as brush, eraser, area selection, and shortcut shape. The above shortcut tools called by the drawing application are different from corresponding resident shortcuts in other applications for text input. When a user uses the drawing application, a display interface of the drawing application may be the shortcut tool selected by the user, the shortcut tool displayed by the application by default, or the shortcut tool determined based on the usage preference of the user, therefore displays the shortcut tool in the corresponding application. The shortcut tool determined by the user in the currently running application is displayed as a default tool in the current application used by the user. That is, the display of the shortcut tool selected by the user using the currently running application and the display of the keyboard toolbar may be blocked by each other, or are displayed in a stack in order to avoid such blocking, which affects the display range. In the example of the present disclosure, when the keyboard toolbar is called for display, the third partition is determined in the keyboard toolbar, and the other shortcut tool determined by the user in the current application is displayed in the third partition. It can be understood that the keyboard toolbar may include the first partition and the second partition at the same time, or may include the first partition, the second partition, and the third partition at the same time, or may also include only the first partition.

Figure 9:
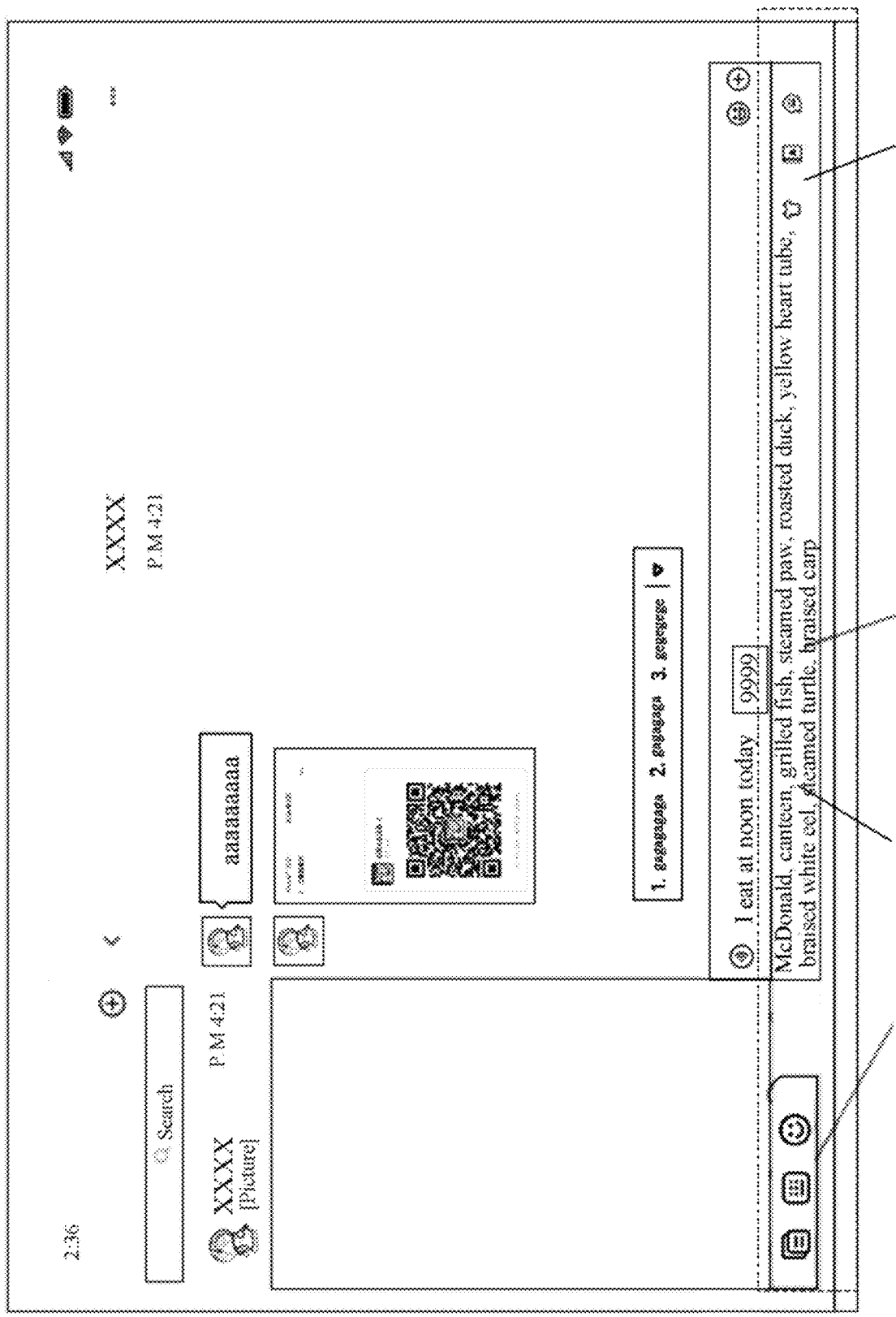
FIG. 9 is an application schematic diagram of a method for displaying a keyboard toolbar according to an example of the present disclosure.

FIG. 9 is an application schematic diagram of a method for displaying a keyboard toolbar according to an example of the present disclosure. Referring to FIG. 9, the display screen of the terminal displays a page of using an instant messaging application. The keyboard toolbar includes the first partition, the second partition, and the third partition. The first partition is used to display the resident shortcut tool. The keyboard toolbar further includes the second partition used to display the associated word corresponding to the input text. The input text is "I eat at noon today", and the associated words displayed by the second partition are "McDonald's, canteen, grilled fish . . . ". The third partition displays the shortcut tool selected by the user in the currently running application.

According to the example of the present disclosure, the terminal is connected with the external physical keyboard for input, and the keyboard toolbar with a plurality of partitions is displayed in the resident manner on the display screen of the terminal. Different partitions in the keyboard toolbar are used to display different toolbars, and include the first partition for displaying the resident shortcut tool. The first partition is residentially displayed in the keyboard toolbar. When the current running application of the terminal calls another shortcut tool that is different from the resident shortcut tool, said another shortcut tool determined by the user in the current application is displayed in the third partition, which prevents the display of the keyboard toolbar from being conflicted with the display of the shortcut tool corresponding to another application, thereby optimizing the terminal display interface.

Figure 10:
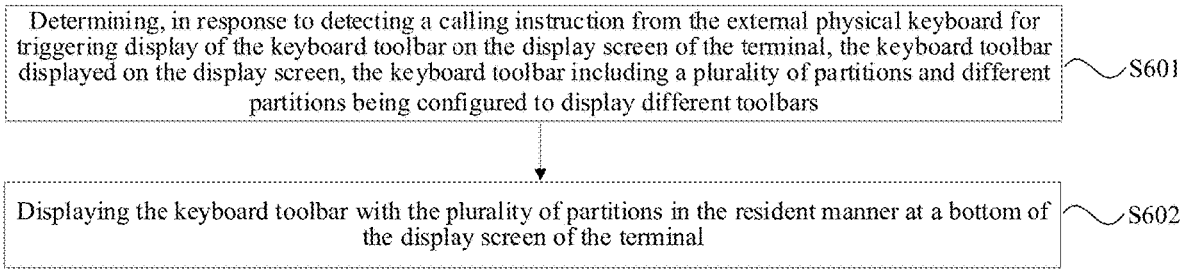
FIG. 10 is a flowchart showing a method for displaying a keyboard toolbar according to an example of the present disclosure.

FIG. 10 is a flowchart showing a method for displaying a keyboard toolbar according to an example of the present disclosure. As shown in FIG. 10, the method for displaying the keyboard toolbar includes:

step S601, determining, in response to detecting a calling instruction from the external physical keyboard for triggering display of the keyboard toolbar on the display screen of the terminal, the keyboard toolbar displayed on the display screen, the keyboard toolbar including a plurality of partitions and different partitions being configured to display different toolbars; and step S602, displaying the keyboard toolbar with the plurality of partitions in the resident manner at a bottom of the display screen of the terminal.

In the example of the present disclosure, the terminal is connected with the external physical keyboard, and the external physical keyboard is used for input. The calling instruction is input through the external physical keyboard, and the keyboard toolbar with a plurality of partitions is displayed in the resident manner on the display screen of the terminal. Different partitions of the keyboard toolbar are used to display different toolbars. The keyboard toolbar is residentially displayed at the bottom of the display screen of the terminal. It can be understood that when the keyboard toolbar with the plurality of partitions is displayed in the resident manner at the bottom of the display screen of the terminal, the display of the current application on the display screen of the terminal or the display range of the current system operation interface as a whole moves to the top of the screen display to ensure that the display of the keyboard toolbar does not cover the current display of the terminal.

According to the example of the present disclosure, the terminal is connected with external physical keyboard for input, and the keyboard toolbar with a plurality of partitions is displayed in the resident manner on the display screen of the terminal. Different partitions in the keyboard toolbar are used to display different toolbars, and the keyboard toolbar is residentially displayed at the bottom of the display screen of the terminal, which realizes the partition display of the keyboard toolbar, avoids the current display content on the screen from being blocked, and improves the input operation experience of the user.

Based on the same concept, an example of the present disclosure also provides a device for displaying a keyboard toolbar.

It can be understood that, in order to implement the above-mentioned functions, the device provided in the example of the present disclosure includes hardware structures and/or software modules corresponding to respective functions. In combination with units and algorithm steps of the examples disclosed in the example of the present disclosure, the example of the present disclosure can be implemented in the form of hardware or a combination of hardware and computer software. Whether a certain function is executed by hardware or computer software-driven hardware depends on the specific application and design constraint conditions of the technical solution. Those skilled in the art can use different methods for each specific application to implement the described functions, but such implementation should not be considered as going beyond the scope of the technical solutions of the examples of the present disclosure.

Figure 11:
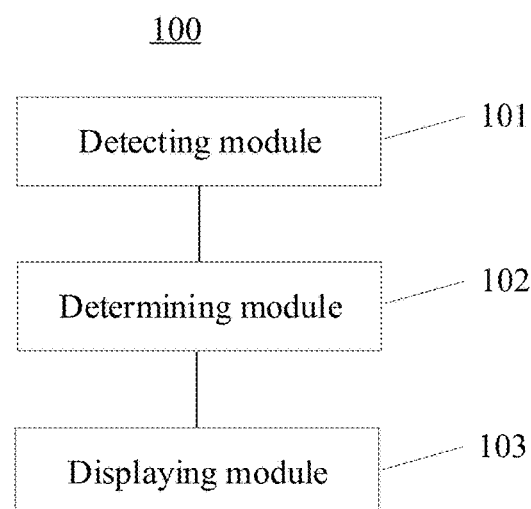
FIG. 11 is a block diagram showing a device for displaying a keyboard toolbar according to an example of the present disclosure.

FIG. 11 is a block diagram of a device for displaying a keyboard toolbar according to an example of the present disclosure. The device for displaying the keyboard toolbar is applied to a terminal. The terminal has a display screen and is connected with an external physical keyboard. Referring to FIG. 11, the device 100 for displaying the keyboard toolbar includes a detecting module 101, a determining module 102, and a displaying module 103.

The detecting module 101 is configured to detect a calling instruction from the external physical keyboard for triggering display of the keyboard toolbar on the display screen of the terminal.

The determining module 102 is configured to determine the keyboard toolbar displayed on the display screen. The keyboard toolbar includes a plurality of partitions and different partitions are configured to display different toolbars.

The displaying module 103 is configured to display the keyboard toolbar with the plurality of partitions in a resident manner on the display screen of the terminal.

In an example, the determining module 102 determines the keyboard toolbar displayed on the display screen by: determining a resident shortcut tool residentially displayed in the keyboard toolbar; and determining the keyboard toolbar including a first partition, the first partition being configured to residentially display the resident shortcut tool.

In an example, the determining module 102 determines the keyboard toolbar displayed on the display screen by:

determining an associated word corresponding to an input text in response to that the calling instruction is an input method calling instruction and the input text is displayed in a text input box of the display screen; and determining the keyboard toolbar including a second partition, the second partition being configured to display the associated word corresponding to the input text.

In an example, the displaying module 103 is further configured to update the associated word displayed in the second partition in response to receiving a gesture operation for updating the associated word in the second partition.

In an example, the determining module determines 102 the keyboard toolbar displayed on the display screen by: obtaining a shortcut tool selected by a user from an other shortcut tool different from the resident shortcut tool in response to that an application currently run on the terminal calls said other shortcut tool; and determining the keyboard toolbar including a third partition, the third partition being configured to display the shortcut tool selected by the user from said other shortcut tool.

In an example, the displaying module 103 displays the keyboard toolbar with the plurality of partitions in the resident manner on the display screen of the terminal by: displaying the keyboard toolbar with the plurality of partitions in the resident manner at a bottom of the display screen of the terminal.

Regarding the device in the foregoing examples, the specific manner in which each module performs operation has been described in detail in the examples of the method, and detailed description thereof will not be repeated herein.

Figure 12:
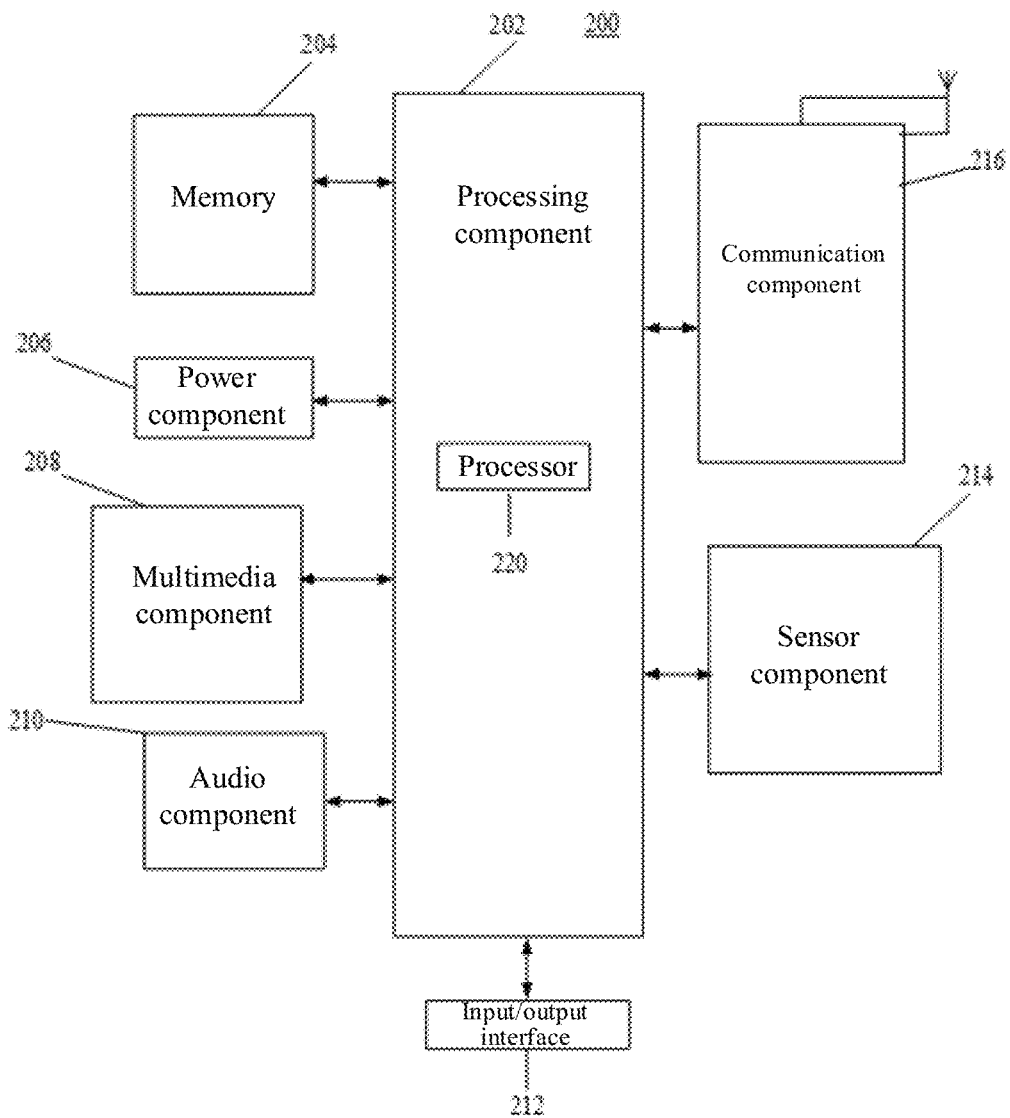
FIG. 12 shows a block diagram of a device for displaying a keyboard toolbar according to an example of the present disclosure.

FIG. 12 is a block diagram showing a device 200 for displaying a keyboard toolbar according to an example of the present disclosure. For example, the device 200 may be a mobile phone, a computer, a digital broadcasting terminal, a messaging device, a game console, a tablet device, a medical device, a fitness device, a personal digital assistant and the like.

Referring to FIG. 12, the device 200 may include one or more of a processing component 202, a memory 204, a power component 206, a multimedia component 208, an audio component 210, an input/output (I/O) interface 212, a sensor component 214, and a communication component 216.

The processing component 202 generally controls the overall operations of the device 200, such as operations associated with display, telephone calls, data communications, camera operations, and recording operations. The processing component 202 may include one or more processors 220 to execute instructions to complete all or part of the steps of the foregoing method. In addition, the processing component 202 may include one or more modules to facilitate interaction between the processing component 202 and other components. For example, the processing component 202 may include a multimedia module to facilitate the interaction between the multimedia component 208 and the processing component 202.

The memory 204 is configured to store various types of data to support the operation of the device 200. Examples of these data include instructions for any application or method operating on the device 200, contact data, phone book data, messages, pictures, videos and the like. The memory 204 may be implemented by any type of volatile or non-volatile storage device or a combination thereof, such as static random access memory (SRAM), electrically erasable programmable read-only memory (EEPROM), erasable and programmable read-only memory (EPROM), programmable read-only memory (PROM), read-only memory (ROM), magnetic memory, flash memory, magnetic disk or optical disk.

The power component 206 provides power to various components of the device 200. The power component 206 may include a power management system, one or more power supplies, and other components associated with generating, managing, and distributing power for the device 200.

The multimedia component 208 includes a screen that provides an output interface between the device 200 and the user. In some examples, the screen may include a liquid crystal display (LCD) and a touch panel (TP). If the screen includes a touch panel, the screen may be implemented as a touch screen to receive input signals from the user. The touch panel includes one or more touch sensors to sense touch, sliding, and gestures on the touch panel. The touch sensor may not only sense the boundary of the touch or slide action, but also detect the duration and pressure related to the touch or slide operation. In some examples, the multimedia component 208 includes a front camera and/or a rear camera. When the device 200 is in an operation mode, such as a shooting mode or a video mode, the front camera and/or the rear camera can receive external multimedia data. Each front camera and rear camera may be a fixed optical lens system or have focal length and optical zoom capabilities.

The audio component 210 is configured to output and/or input audio signals. For example, the audio component 210 includes a microphone (MIC), and when the device 200 is in an operation mode, such as a call mode, a recording mode, and a voice recognition mode, the microphone is configured to receive an external audio signal. The received audio signal can be further stored in the memory 204 or sent via the communication component 216. In some examples, the audio component 210 further includes a speaker for outputting audio signals.

The I/O interface 212 provides an interface between the processing component 202 and a peripheral interface module. The above-mentioned peripheral interface module may be a keyboard, a click wheel, a button, and the like. These buttons may include but are not limited to home button, volume button, start button, and lock button.

The sensor component 214 includes one or more sensors for providing the device 200 with various aspects of state evaluation. For example, the sensor component 214 can detect the on/off status of the device 200 and the relative positioning of components. For example, the component is a display and keypad of the device 200. The sensor component 214 can also detect the position change of the device 200 or a component of the device 200, the presence or absence of contact between the user and the device 200, the orientation or acceleration/deceleration of the device 200, and the temperature change of the device 200. The sensor component 214 may include a proximity sensor configured to detect the presence of nearby objects when there is no physical contact. The sensor component 214 may also include a light sensor, such as a CMOS or CCD image sensor, for use in imaging applications. In some examples, the sensor component 214 may also include an acceleration sensor, a gyroscope sensor, a magnetic sensor, a pressure sensor, or a temperature sensor.

The communication component 216 is configured to facilitate wired or wireless communication between the device 200 and other devices. The device 200 can access a wireless network based on a communication standard, such as WiFi, 2G, or 3G, or a combination thereof. In an example, the communication component 216 receives a broadcast signal or broadcast related information from an external broadcast management system via a broadcast channel. In an example, the communication component 216 further includes a near field communication (NFC) module to facilitate short-range communication. For example, the NFC module can be implemented based on radio frequency identification (RFID) technology, infrared data association (IrDA) technology, ultra-wideband (UWB) technology, Bluetooth (BT) technology and other technologies.

In an example, the device 200 may be implemented by one or more application specific integrated circuits (ASIC), digital signal processors (DSP), digital signal processing device (DSPD), programmable logic devices (PLD), field programmable gate array (FPGA), controller, microcontroller, microprocessor, or other electronic components, used to perform the above-mentioned methods.

An example also provides a non-transitory computer-readable storage medium including instructions, such as the memory 204 including instructions, and the instructions may be executed by the processor 220 of the device 200 to complete the foregoing method. For example, the non-transitory computer-readable storage medium may be ROM, random access memory (RAM), CD-ROM, magnetic tape, floppy disk, optical data storage device and the like.

It can be understood that in the present disclosure, the term "a plurality of" refers to two or more than two, and other quantifiers have similar meanings. The term "and/or" describes relationship of associated objects, indicating that there can be three relationships, for example, A and/or B may mean: A alone exists, A and B exist at the same time, and B exists alone. The character "I" generally indicates that the associated objects before and after "I" are in an "or" relationship. A singular form such as "a", "said" and "the" are also intended to include plural forms, unless the context clearly indicates other meanings.

It can be further understood that the terms "first", "second" and the like are used to describe various information, but the information should not be limited to these terms. These terms are only used to distinguish the same type of information from each other, and do not indicate a specific order or degree of importance. In fact, the expression such as "first" and "second" can be used interchangeably. For example, without departing from the scope of the present disclosure, first information may also be referred to as second information, and similarly, second information may also be referred to first information.

It can be further understood that, unless otherwise specified, the term "connect" includes a direct connection between two objects without other components, and also includes an indirect connection between the two objects with other elements therebetween.

It can be further understood that although the operations in the examples of the present disclosure are described in a specific order in the drawings, they should not be understood as requiring these operations to be performed in the specific order shown or in a serial order, or requiring to perform all the operations shown to get the desired result. In certain circumstances, multitasking and parallel processing may be advantageous.

The present disclosure may include dedicated hardware implementations such as disclosure specific integrated circuits, programmable logic arrays and other hardware devices. The hardware implementations can be constructed to implement one or more of the methods described herein. Examples that may include the apparatus and systems of various implementations can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors. The module refers herein may include one or more circuit with or without stored code or instructions. The module or circuit may include one or more components that are connected.

Those skilled in the art will easily conceive of other examples of the present disclosure after considering the specification and practicing the present disclosure disclosed herein. The present application is intended to cover any variations, uses, or adaptive changes of the present disclosure. These variations, uses, or adaptive changes follow the general principles of the present disclosure and include common knowledge or conventional technical means in the technical field that are not disclosed in the present disclosure. The description and the examples are to be regarded as exemplary only.

It should be understood that the present disclosure is not limited to the precise structure that has been described above and shown in the drawings, and various modifications and changes can be made without departing from the scope thereof

What is claimed is:

1. A method for displaying a keyboard toolbar, applied to a terminal having a display screen and being connected with an external physical keyboard, comprising:
   determining, in response to detecting a calling instruction from the external physical keyboard for triggering display of the keyboard toolbar on the display screen of the terminal, the keyboard toolbar displayed on the display screen, the keyboard toolbar comprising a plurality of partitions and different partitions being configured to display different toolbars, and the calling instruction being generated in response to an input of a user on the external physical keyboard; and
   displaying the keyboard toolbar with the plurality of partitions in a resident manner on the display screen of the terminal,
   wherein determining the keyboard toolbar displayed on the display screen comprises:
   determining a resident shortcut tool residentially displayed in the keyboard toolbar;
   determining the keyboard toolbar comprising a first partition, the first partition being configured to residentially display the resident shortcut tool;

obtaining a shortcut tool selected by the user from an other shortcut tool different from the resident shortcut tool in response to that an application currently run on the terminal calls said other shortcut tool; and determining the keyboard toolbar comprising a third partition configured to display the shortcut tool selected by the user.

2. The method according to claim 1, wherein determining the keyboard toolbar displayed on the display screen comprises:

determining an associated word corresponding to an input text in response to that the calling instruction is an input method calling instruction and the input text is displayed in a text input box of the display screen; and determining the keyboard toolbar comprising a second partition, the second partition being configured to display the associated word corresponding to the input text.

3. The method according to claim 2, further comprising:
updating the associated word displayed in the second partition in response to receiving a gesture operation for updating the associated word in the second partition.

4. The method according to claim 1, wherein displaying the keyboard toolbar with the plurality of partitions in the resident manner on the display screen of the terminal comprises:

displaying the keyboard toolbar with the plurality of partitions in the resident manner at a bottom of the display screen of the terminal.

5. A device for displaying a keyboard toolbar, applied to a terminal having a display screen and being connected with an external physical keyboard, comprising:

a processor;

a memory storing instructions that, when being executed by the processor, cause the processor to perform:

determining, in response to detecting a calling instruction from the external physical keyboard for triggering display of the keyboard toolbar on the display screen of the terminal, the keyboard toolbar displayed on the display screen, the keyboard toolbar comprising a plurality of partitions and different partitions being configured to display different toolbars, and the calling instruction being generated in response to an input of a user on the external physical keyboard; and displaying the keyboard toolbar with the plurality of partitions in a resident manner on the display screen of the terminal, wherein the instructions caused the processor to perform determining the keyboard toolbar displayed on the display screen further cause the processor to perform:

determining a resident shortcut tool residentially displayed in the keyboard toolbar;

determining the keyboard toolbar comprising a first partition, the first partition being configured to residentially display the resident shortcut tool;

obtaining a shortcut tool selected by the user from an other shortcut tool different from the resident shortcut tool in response to that an application currently run on the terminal calls said other shortcut tool; and determining the keyboard toolbar comprising a third partition configured to display the shortcut tool selected by the user.

6. The device according to claim 5, wherein the instructions caused the processor to perform determining the keyboard toolbar displayed on the display screen further cause the processor to perform:

determining an associated word corresponding to an input text in response to that the calling instruction is an input method calling instruction and the input text is displayed in a text input box of the display screen; and determining the keyboard toolbar comprising a second partition, the second partition being configured to display the associated word corresponding to the input text.

7. The device according to claim 6, wherein the instructions further cause the processor to perform:

updating the associated word displayed in the second partition in response to receiving a gesture operation for updating the associated word in the second partition.

8. The device according to claim 5, wherein the instructions caused the processor to perform displaying the keyboard toolbar with the plurality of partitions in the resident manner on the display screen of the terminal further cause the processor to perform:

displaying the keyboard toolbar with the plurality of partitions in the resident manner at a bottom of the display screen of the terminal.

9. A non-transitory computer-readable storage medium storing instructions that, when being executed by a processor of a mobile terminal having a display screen and being connected with an external physical keyboard, cause the mobile terminal to perform:

determining, in response to detecting a calling instruction from the external physical keyboard for triggering display of the keyboard toolbar on the display screen of the terminal, the keyboard toolbar displayed on the display screen, the keyboard toolbar comprising a plurality of partitions and different partitions being configured to display different toolbars, and the calling instruction being generated in response to an input of a user on the external physical keyboard; and displaying the keyboard toolbar with the plurality of partitions in a resident manner on the display screen of the terminal, wherein the instructions caused the mobile terminal to perform determining the keyboard toolbar displayed on the display screen further cause the mobile terminal to perform:

determining a resident shortcut tool residentially displayed in the keyboard toolbar;

determining the keyboard toolbar comprising a first partition, the first partition being configured to residentially display the resident shortcut tool;

obtaining a shortcut tool selected by the user from an other shortcut tool different from the resident shortcut tool in response to that an application currently run on the terminal calls said other shortcut tool; and determining the keyboard toolbar comprising a third partition configured to display the shortcut tool selected by the user.

10. The non-transitory computer-readable storage medium according to claim 9, wherein the instructions caused the mobile terminal to perform determining the keyboard toolbar displayed on the display screen further cause the mobile terminal to perform:

determining an associated word corresponding to an input text in response to that the calling instruction is an input method calling instruction and the input text is displayed in a text input box of the display screen; and determining the keyboard toolbar comprising a second partition, the second partition being configured to display the associated word corresponding to the input text.

11. The non-transitory computer-readable storage medium according to claim 10, wherein the instructions further cause the mobile terminal to perform:

updating the associated word displayed in the second partition in response to receiving a gesture operation for updating the associated word in the second partition.

12. The non-transitory computer-readable storage medium according to claim 9, wherein the instructions caused the mobile terminal to perform displaying the keyboard toolbar with the plurality of partitions in the resident manner on the display screen of the terminal further cause the mobile terminal to perform:

displaying the keyboard toolbar with the plurality of partitions in the resident manner at a bottom of the display screen of the terminal.

\* \* \* \* \*